UNITED STATES PATENT OFFICE.

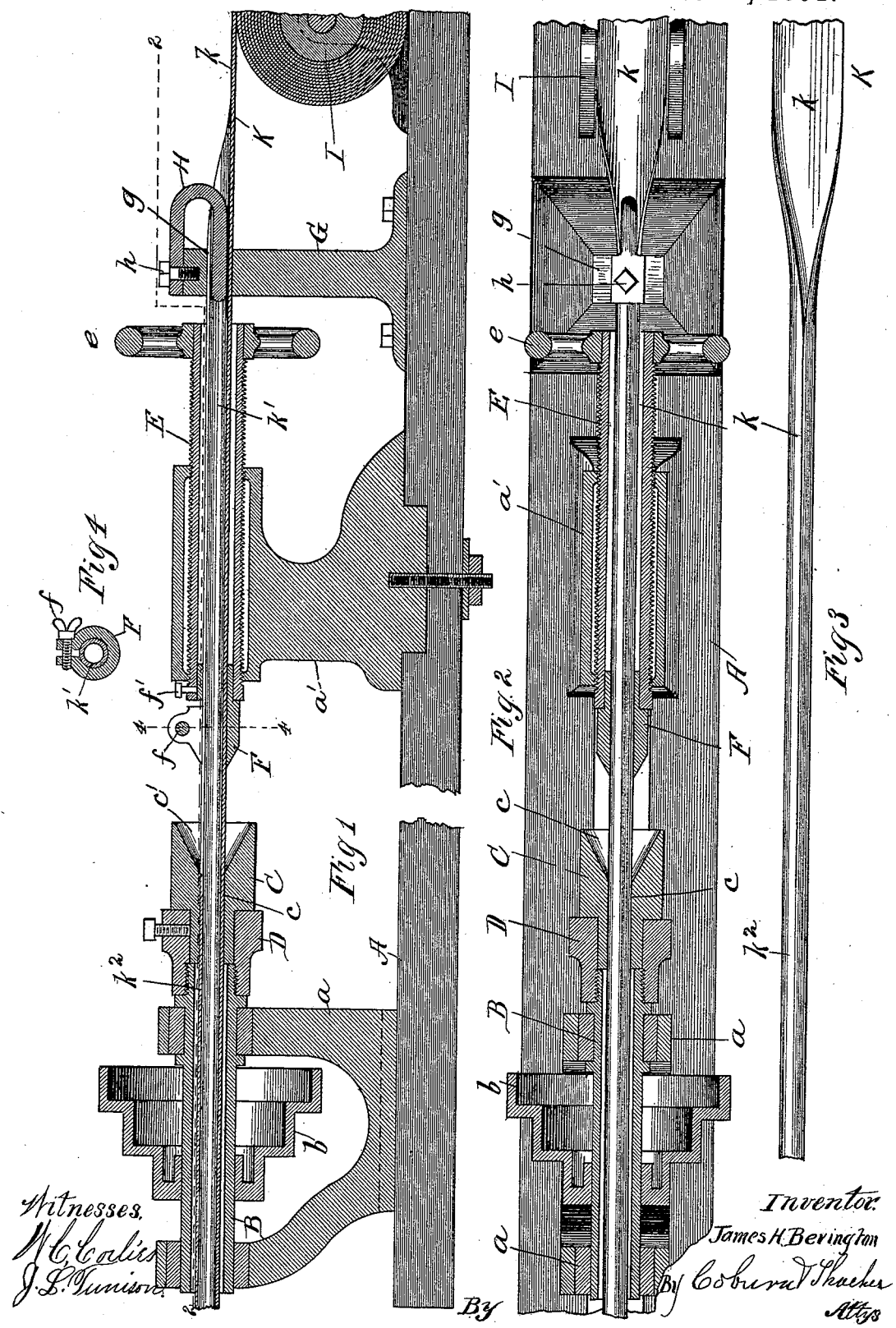

JAMES H. BEVINGTON, OF CHICAGO, ILLINOIS, ASSIGNOR TO THE NEW PROCESS WELDING AND SPINNING COMPANY, OF SAME PLACE.

MODE OF MAKING TUBES.

SPECIFICATION forming part of Letters Patent No. 463,617, dated November 24, 1891.

Application filed March 21, 1891. Serial No. 385,894. (No model.)

*To all whom it may concern:*

Be it known that I, JAMES H. BEVINGTON, a citizen of the United States, residing at Chicago, in the county of Cook and State of Illinois, have invented a certain new and useful Improvement in Processes of Making Tubes, which is fully set forth in the following specification, reference being had to the accompanying drawings, in which—

Figure 1 represents a longitudinal section of a machine adapted to carry out my process; Fig. 2, a plan section of the same, taken on the broken line 2 2 of Fig. 1; Fig. 3, a plan view showing in one piece at different portions thereof the strip of metal for the tube, the tube formed up, and the tube completed by the welding of the edges; and Fig. 4, a detail cross-section of the same, taken on the line 4 4 of Fig. 1.

My invention relates to a process for the manufacture of tubes, the whole operation being, preferably, performed by one machine.

The invention consists in forming a strip of metal, of suitable width and suitably prepared, into the shape of a tube, and then passing this unclosed tube to the action of a rapidly-revolving hollow die, by means of which the unclosed edges of the tube are perfectly welded together, thereby completing the tube.

The invention is somewhat closely related to my prior patent, No. 444,721, dated January 13, 1891, in that the mode of welding is similar to that set forth in said patent.

I will describe somewhat in detail a machine in which my process may be carried out practically in one way and upon a single machine, though for the purpose of illustration only, as the particular mechanism employed for this purpose is not a material part of the invention, the only requirement being that the machinery shall be adapted to perform the several operations required in carrying out the process to completion. The improvements which I believe to be new and wish to secure by Letters Patent will then be pointed out more definitely in the claim.

The machine shown in the drawings is in general features very much like a lathe, and is like the machine described and shown in my prior application, Serial No. 380,770, with some additional features.

Upon the bed A of the machine are mounted standards $a$ $a'$, and in the former, which is forked, is mounted a hollow shaft B provided with a driving-pulley $b$, whereby it is rapidly rotated. A hollow circular die C is secured to the inner end of this shaft by means of a die-holder D. This is the welding-die, and is therefore of very hard metal, and is provided with a central perforation $c$ running through it, with a flaring mouth $c'$ at the outer end of the die. In the standard $a'$ is mounted a tail-stock E, which is hollow and suitably threaded to serve as a feeding device, for which purpose it is provided with a hand-wheel $e$ on its outer end. A clamp F is set in the inner end of the tail-stock, being of any suitable construction to clasp and firmly hold a round tube. In the drawings it is shown in the well-known form of a divided ring with a screw $f$ for the purpose of drawing the two parts together. The stem of the clamp must of course be fixed in the tail-stock. This may be accomplished by a binding-screw $f'$. A third standard G is mounted upon the bed somewhat outside of the tail-stock, and on this standard is mounted a mandrel H, which corresponds in size to that of the required tube. This mandrel extends just through the standard G, which is provided with an aperture $g$ for this purpose, though this aperture is a little larger than the mandrel, its diameter corresponding to the outer diameter of the tube. At its outer or forward end the mandrel is bent upward and backward upon itself, and this upper turn or member is fastened to the top of the standard by means of a screw-bolt $h$, as seen in Fig. 1, or in any other suitable way. The metal plate from which it is intended to form the tube is cut into a strip or strips of such width as to form a tube of the desired size when rolled up in circular form with the opposite edges brought together. This strip or strips may be wound upon a suitable drum I, mounted on the bed of the machine a little in front of the mandrel-standard, as seen in Fig. 1, where the strip K is shown wound or coiled upon the drum, the latter being free to turn, so that the strip may be run off.

The operation is as follows: The metal strip K, wound upon the drum, as described, is led thence through the aperture $g$ around the mandrel H, by which operation it is formed up around the mandrel in the shape of a tube, the edges of the plate being brought close together, but of course not joined. The end of this unclosed tube is carried along the tail-stock and to the revolving die. The clamp F is then closed tightly upon the tube and the revolving die set in motion. The tail-stock, which in the first instance is drawn back as far as possible, is now set up gradually, thus feeding the unclosed tube into and through the revolving die, and by the action of this hard-faced die rapidly revolving the tube is heated to a welding heat and the edges thoroughly and completely welded together, thus closing the joint and leaving a perfectly smooth and finished surface. The feeding of the tube through the die will of course draw the strip from the drum and through the forming-aperture in the standard G, thus continuously forming up the tube around the mandrel during the feeding operation. With the device here shown it is obvious that when the limit of the feed movement of the tail-stock is reached the clamp must be loosened. Then the tail-stock is again retracted, the clamp refastened, and the feed forward is again made. The tube delivered from the hollow shaft B will be a completed article with the joint perfectly closed and smoothly finished by the action of the die, so as to present a seamless appearance. It is evident that the metal from the drum to the hollow shaft B will present three different conditions. The first section $k$, between the roll and the forming-mandrel, is straight; but with its edges gradually turning upward and inward, as seen in Figs. 2 and 3. The second section, between the mandrel and the revolving die, will be in the form of an unclosed tube, as indicated by $k'$ in said figures, while the last section, beyond the revolving die, will be a finished tube, as indicated by $k^2$ in the figures.

It will be seen that in carrying out my process with the apparatus herein shown and described the feed is intermittent; but a tube can be made of any length desired. It is also evident that if a feed mechanism was applied to the tube by which the metal would be drawn through the machine by a slow continuous movement the action of the devices would be constant, there being no intermission in the feed. I contemplate such feeding mechanism as well as that here shown, the devices shown and described being given simply for purposes of illustration. Obviously the mechanism for carrying out this process may be largely varied, and I do not limit my invention by restriction to apparatus of any kind.

Instead of forming the unclosed tube, as here shown, it may also be produced by winding the metal strip spirally upon a suitable mandrel, the operation being performed so that the edges of the continuous spiral strip will abut closely upon each other. The tube thus formed is fed through the die, as already explained, and the action of the latter is the same in welding the joint and completely finishing the tube with a smooth surface. It is also obvious that the steps in this process may be performed on different machines. The unclosed tube may be formed on one machine and then submitted to the action of the revolving die on another and separate machine.

Having thus described my invention, what I claim as new, and desire to secure by Letters Patent, is—

1. The herein-described process of making tubes, the same consisting in forming up a strip of metal into an unclosed tube and then passing the latter through a rapidly-revolving die, whereby the edges of the strip are thoroughly welded together and the tube finished, substantially as described.

2. The herein-described process of making tubes on a single machine, the same consisting in drawing a strip of metal lengthwise around a mandrel through a forming-aperture and feeding the unclosed tube thence through a rapidly-revolving die of hard metal, substantially as described.

JAMES H. BEVINGTON.

Witnesses:
CARRIE FEIGEL,
A. M. BEST.